Feb. 21, 1933.　　　O. G. WELLTON　　　1,898,412
CONTINUALLY VARIABLE CHANGE SPEED GEAR
Filed Dec. 28, 1931　　　4 Sheets-Sheet 1
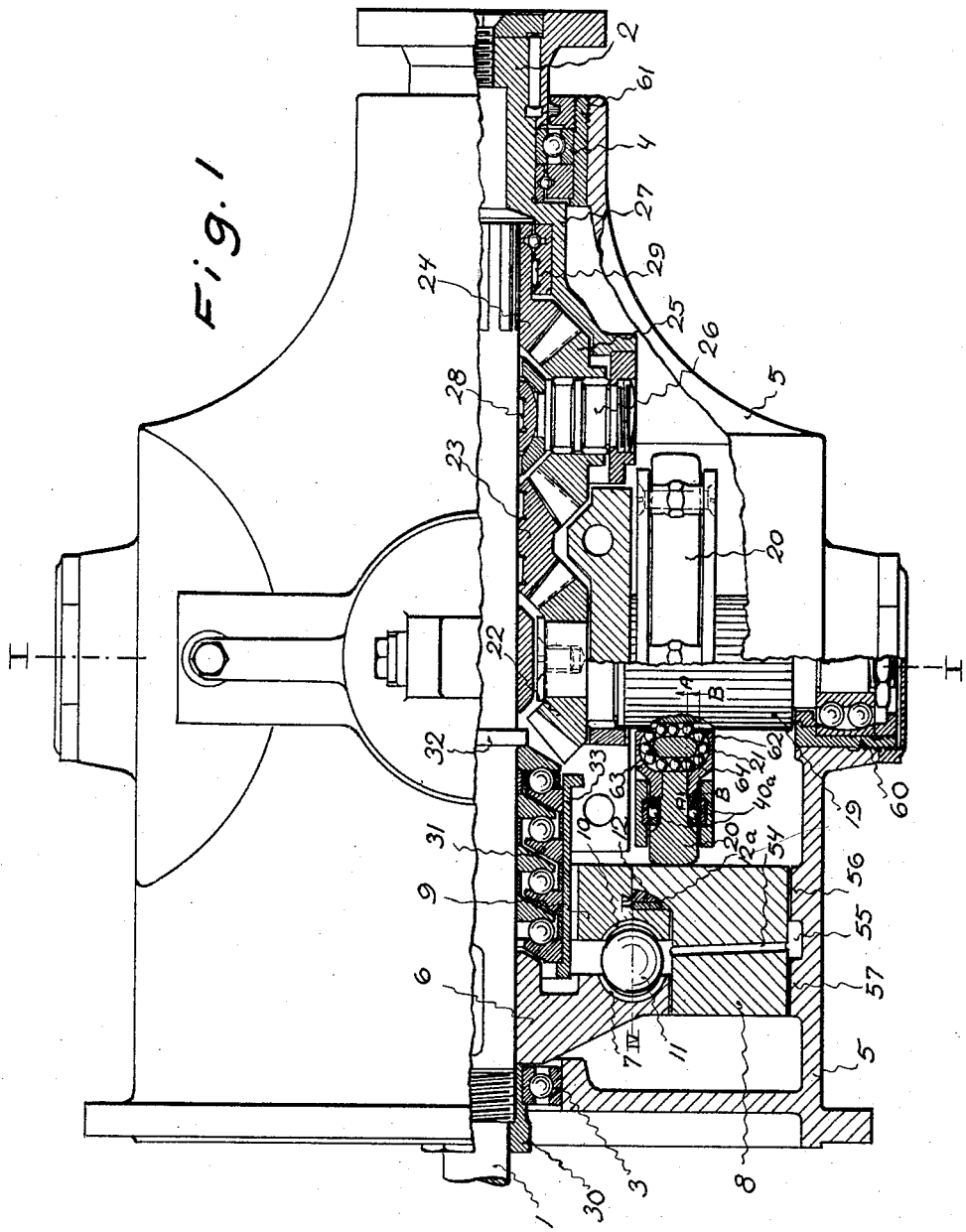
INVENTOR
O. G. WELLTON
By Fetherstonhaugh & Tonsley
Attys

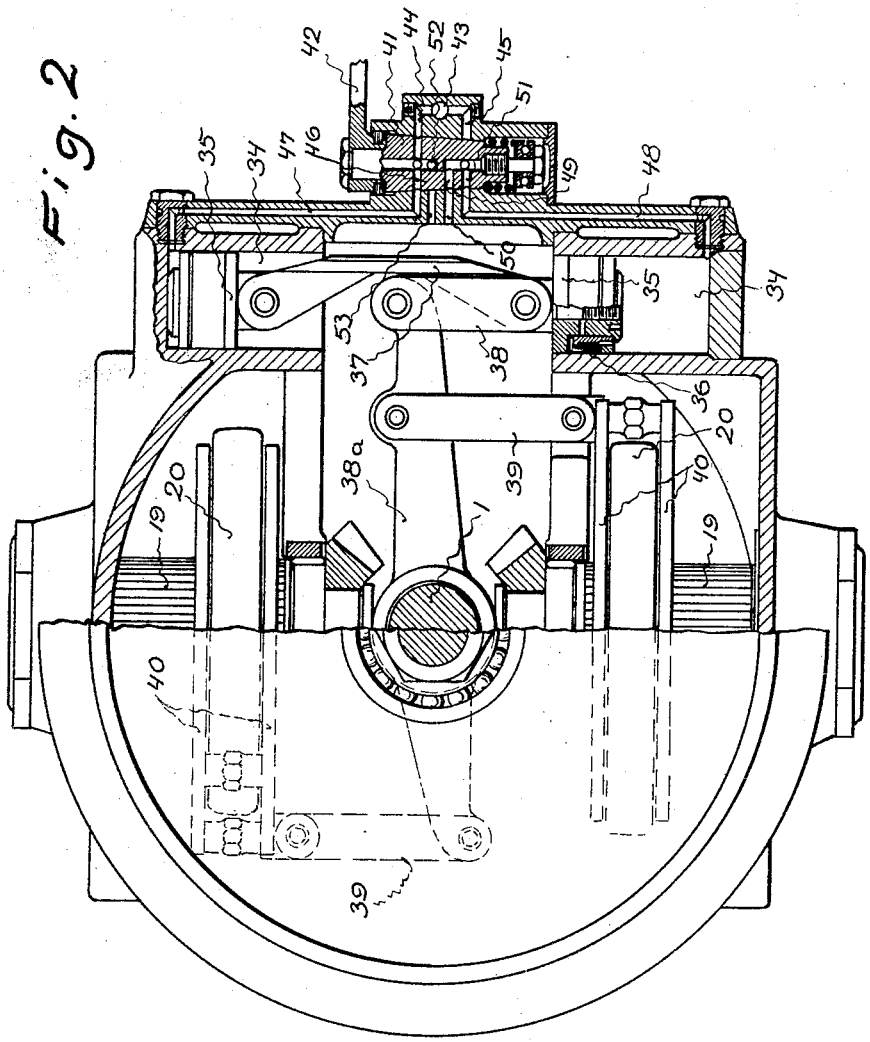

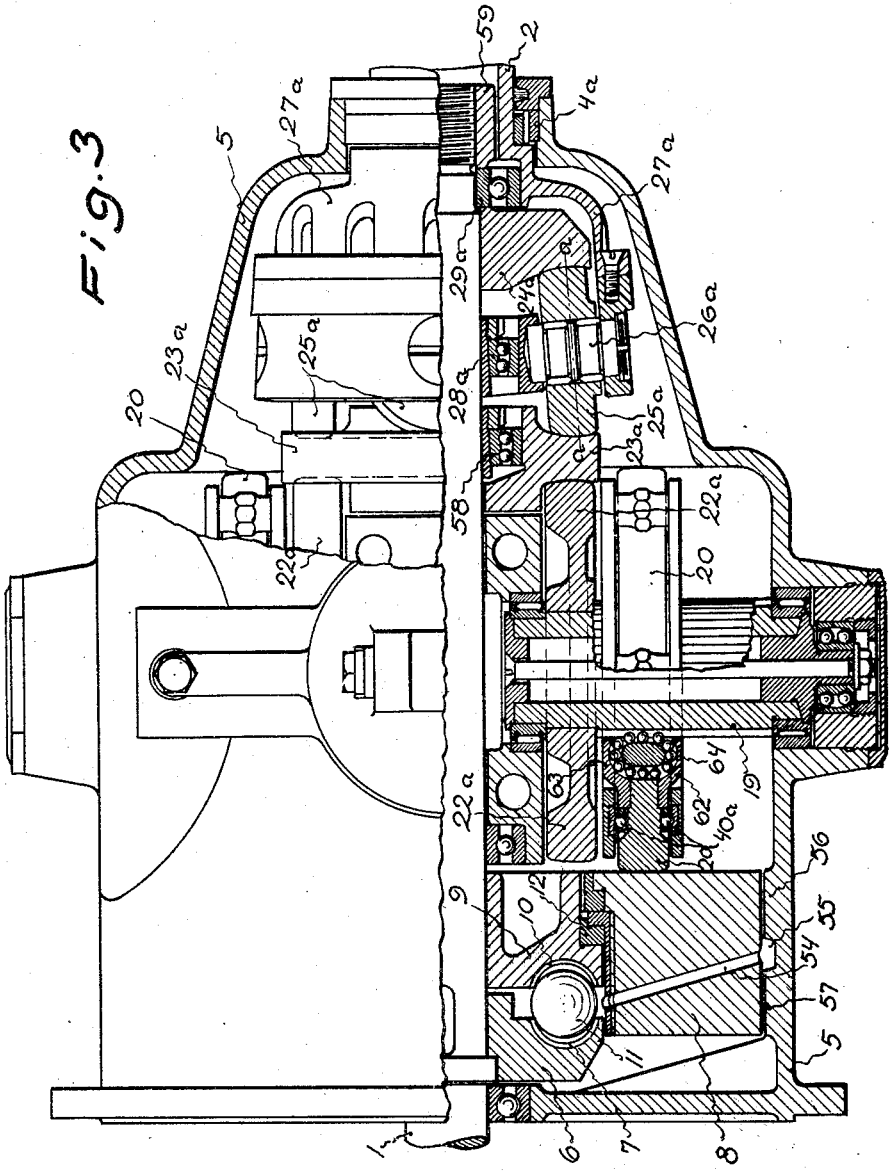

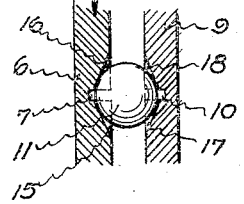
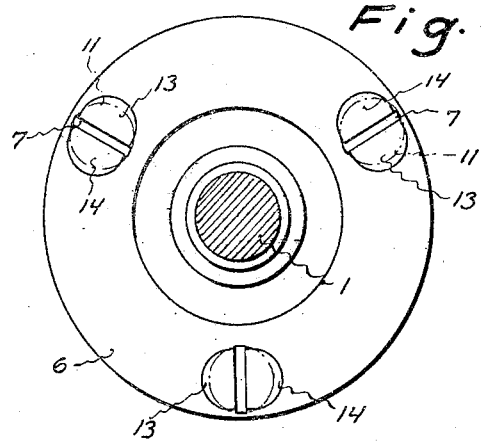
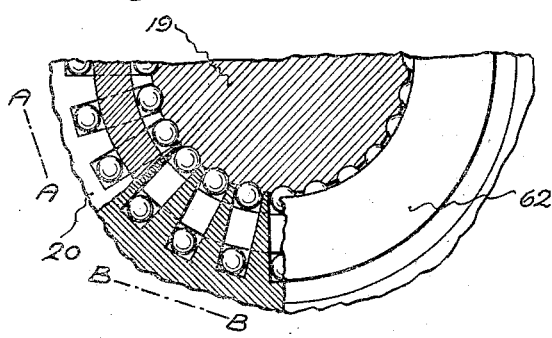
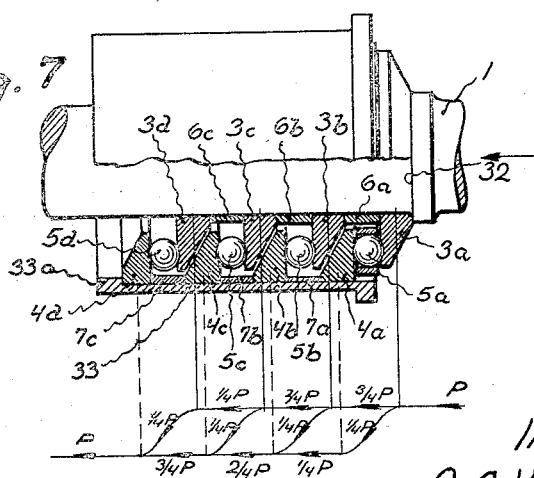

Patented Feb. 21, 1933

1,898,412

UNITED STATES PATENT OFFICE

OTTO GOTTFRIED WELLTON, OF STOCKHOLM, SWEDEN

CONTINUALLY VARIABLE CHANGE SPEED GEAR

Application filed December 28, 1931, Serial No. 583,565, and in Sweden September 16, 1931.

The United States patent application Ser. No. 560,181, filed August 29, 1931, discloses a continually variable change speed gear comprising a differential gear, the planet wheel support of which is connected with a driven shaft, while the two sun wheels thereof are connected with a driving shaft and an intermediate shaft, respectively, the said intermediate shaft being connected with the driving shaft by means of a gear consisting of a gear disc adapted to be rotated by means of the driving shaft, and to coact with rollers or the like displaceably mounted on and non-rotatably in relation to corresponding shafts mounted at right angles to the intermediate shaft and connected with the last mentioned shaft in a suitable manner. The said rollers and the disc coacting therewith are very hard, as a difference from common friction gears, and the rollers are pressed very hardly against the disc, so that both of such means are subjected to a temporary deformation (a depression in the surface of the disc and a flattening of the rollers), and thereby the coaction between the members will substantially correspond to the intermesh of a couple of toothed gears with each other. Instead of mounting one of the sun wheels of the differential gear directly on the driving shaft, an intermediate shaft and a deformation gear of the kind referred to may be interposed between said sun wheel and the driving shaft, and an embodiment of this kind is also shown in the drawings belonging to the aforesaid patent.

The present invention refers to a gear means of the same type and has for its main object to provide certain improvements thereof, as will be nearer described in the following.

According to the United States patent application Ser. No. 560,181, filed August 29, 1931, the contact pressure between the gear disc and the rollers coacting therewith is established by means of a pressure fluid, for instance oil, which is adapted to act on a piston slidably mounted in the gear casing and connected with the shafts of the rollers, so that the latter are pressed towards the gear disc at the displacement of the piston. The admittance of the pressure fluid to the piston is manually controlled by means of a suitable valve member.

By these means it is certainly possible to obtain any desired contact pressure between the rollers and the gear disc, but no means is at hand adapted to secure that the contact pressure at each moment has its correct value, i. e. so that it will not become too great and thereby to cause an overload of the rollers and other movable parts of construction, or too small for the purpose intended. Naturally, the contact pressure between the gear disc and the rollers ought to be in a distinct relation to the tangential pressure, and, in its turn, this pressure is directly proportional with the variable moment of torsion acting on the rollers, this moment being a function of the amount of energy transmitted by the gear means, i. e. the amount of the masses to be accelerated or moved. In case the gear means are used on moving vehicles, these values, or amounts, are unknown to the driver, and naturally it is therefore impossible for him to adjust the pressure between the gear disc and the rollers so that the optimal value of power transmission is obtained.

One of the objects of the present invention is to eliminate this disadvantage adhering to the known gear means, and to provide efficient means for an automatic control of the pressure between the gear disc and the rollers, so that this pressure will always attain the correct value.

In connection with a gear means of the type referred to, the invention has also for its object to avoid the employment of toothed gears of any kind, and to apply the deformation gear principles throughout. Hereby, the advantage primarily gained is that the gear means will function entirely noiseless. The bevelled gear means employed at several places according to the United States patent application Ser. No. 560,181, filed August 29, 1931, are very difficult to produce, in that they will lose their true shape at the tempering of the constructional parts, and it is very difficult to regain this true shape again by grinding.

A further object of the invention is, in a gear means of the type referred to, to replace the manually operable mechanism for the rollers with a hydraulic means of the same function, and wherein the pressure of the fluid employed is preferably created by the gear means itself.—Hereby the manipulation of the entire gear means is simplified in a very great degree.

Finally, the invention has also for its object to provide an improved bearing means for the rollers coacting with the gear disc.

In the following, the invention is to be described by reference to the accompanying drawings, in which:—

Fig. 1 shows a longitudinal section of a variable change speed gear according to the deformation principles and including a differential gear provided with bevelled gears.

Fig. 2 is a cross section of the mechanism at the line I—I in Fig. 1,

Fig. 3 shows a modified form of the change speed gear, in which no toothed gears are employed, seen in longitudinal section.

Fig. 4 is a section at the line IV—IV in Fig. 1, and

Fig. 5 shows the particulars of the automatically acting pressure control means.

Fig. 6 is drawn to a larger scale, and in two sections it shows the bearing means for the rollers, partially at the line A—A and partially at the line B—B in Fig. 1.

Fig. 7 is a partially sectional side elevation of a thrust bearing employed according to Fig. 1.

Referring to the drawings, and especially to Fig. 1 therein, 1 represents the driving shaft and 2 the driven one, such shafts being mounted in suitable bearings in the two end walls of a casing 5 surrounding the various parts of construction of the change speed gear. A pressure disc 6 is axially displaceably mounted on the shaft 1 within the casing 5 adjacent to the left hand end wall of the latter, this disc being non-rotatably mounted in relation to the shaft and provided at its inner face with a suitable number of grooves or recesses 7 (compare also Figs. 4 and 5).

The pressure disc 6 is positioned within a central bore in a plane gear disc 8, a counter disc 9 being also mounted in said bore at a certain distance from the pressure disc 6. In the same manner as the pressure disc 6, the counter disc 9 is also provided with grooves or recesses 10 positioned in such a manner that they are in register with the corresponding recesses 7 in the first named disc. Each pair of recesses 7 and 10 encloses a ball 11. In the embodiment shown in the drawings, each disc is provided with three recesses equidistantly spaced around the circumference of the discs, but it is apparent that the number of such recesses may be varied at will. At least two recesses ought to be at hand in each disc, however. A laminated friction clutch 12 is positioned between the counter disc 9 and a flange on the disc 8, such means being adapted to slide when the moment of torsion exceeds a certain value so as thereby to prevent an overload of the gear means. In order to make it possible to adjust the position of the gear disc 8, the contact face between the same and the laminated friction clutch 12 is preferably of a spherical shape, as indicated at 12ª.

The shape of the recesses 7 and 10 is better understood from Figs. 4 and 5, of which the Fig. 4 is a section at the line IV—IV in Fig. 1, as stated above, while Fig. 5 shows the pressure disc seen from the right hand end of Fig. 1. Each of the recesses consists of two grooves 13 and 14 of a preferably cylindrical shape and positioned at an obtuse angle in relation to each other, these grooves being arranged in such a manner that they form inclined surfaces 15, 16 and 17, 18 to the plane of rotation of the discs (Fig. 4). When the shaft 1 is at a rest, the ball 11 will consequently take the position shown in Fig. 4, in which it is in contact with all of the faces 15–18. Naturally the balls may be substituted by other bodies of rotation, such as rollers, in case the shape of the recesses is chosen in a corresponding manner.

Radial shafts 19, 19 are mounted within the casing 5 at the inner side of the gear disc 8, and in the embodiment shown these shafts are assumed to be two in number, although another number thereof might also be employed, each of said shafts supporting a roller, or wheel, 20, 20 having preferably a spherical circumference in contact with the gear disc 8. The rollers 20 are axially displaceable on their shafts but non-rotatable in relation thereto, and they are mounted by means of ball bearings having the general reference 21 in Fig. 1, the construction of said ball bearings being better described in the following.

At its inner end, each shaft 19 is rigidly connected with a toothed gear 22 positioned in mesh with a double bevelled gear 23 loosely mounted on the driving shaft 1, such double bevelled gear forming simultaneously one of the sun wheels of the differential gear mounted at the right hand end of the casing 5. The other sun wheel 24 of the differential gear is keyed to the inner end of the shaft 1, and consequently it is driven at the same speed as the latter. A suitable number of planet wheels 25 are coacting with the sun wheels 23 and 24, such planet wheels being mounted on short radial shafts 26 mounted in the planet wheel support 27 connected with the driven shaft 2. As shown in the drawings, the planet wheel support 27 is mounted on the driving shaft 1 by means of a suitable bearing, and at its right hand end the said shaft by means of the bearing 29 is remounted in the planet wheel support 27.

As shown in the drawings, both the shafts 19 and the planet wheel support 27 are adjustable in that the bearings for the same are mounted in sleeves 60 and 61, respectively, screwed into the gear casing. Hereby it is possible to adjust the intermesh of the bevelled gears of the differential gear with each other. The left hand end of the driving shaft 1 is provided with a thread for a nut 30 contacting at its inner end with the pressure disc 6, so that a suitable initial pressure may be established on the balls 11 between the pressure disc 6 and the counter disc 9 by the tightening of said nut. The reaction pressure arising due hereto, and due to the working of the gear means, is relieved by means of a thrust bearing 31 mounted between a flange 32 on the shaft 1 and a sleeve 33 affixed in the casing 5. The bearing 31 is a specially constructed ball bearing adapted to take up the thrust, or axial stresses, and this bearing is provided with a plurality of ball sets arranged in series, as will be described in the following.

The shaft 1 (see Fig. 7) is provided with a number of ball races $3a$—$3d$ (four of them being employed according to the embodiment shown) the rightmost of which $3a$ is in abutment with the flange 32 on the shaft 1. In a corresponding manner the sleeve 33 is provided with a plurality (four) of ball races $4a$—$4d$ extending between the aforesaid ball races $3a$—$3d$, and the leftmost one of which $4d$ abuts against a flange $33a$ positioned at the opposite end of the sleeve 33. The surfaces of the ball races $3a$—$3d$ and $4a$—$4d$ facing each other, i. e. the faces $3a$ and $4a$, $3b$ and $4b$, $3c$ and $4c$, and $3d$ and $4d$, are constructed in the conventional manner for adapting a corresponding number of ball series $5a$—$5d$. The ball races $3a$—$3d$ are kept spaced to the required extent by means of three distance or pressure rings $6a$—$6c$ positioned around the shaft 1, and in a similar manner the ball races $4a$—$4d$ are interspaced within the sleeve 8 by means of three distance or pressure rings $7a$—$7c$. The surfaces of the ball races $4a$ and $3b$, $4b$ and $3c$, and $4c$ and $3d$ facing each other are preferably of a conical shape, as shown in the drawings, the total length of the bearing means being reduced thereby.

Under the provision that the constructional parts are correctly dimensioned and produced from a suitable material, a thrust bearing of the kind described will act in the following manner:—An axial stress, or thrust, arising in the shaft 1 and tending to displace the same towards the left in the figure, will be transmitted to the first ball race $3a$ by means of the flange 32. From the said ball race, a portion of the thrust will be transmitted to the ball race $5a$, another portion thereof by means of the distance ring $6a$ being transmitted to the second ball race $3b$. At this point a further division of the thrust will occur, in that a portion of the same is transmitted to the ball race $5b$, while the remaining amount thereof by means of the distance ring $6b$ is transmitted to the third ball race $3c$. In a similar manner a portion of the thrust is transmitted from the ball race $3c$ to the ball race $5c$, and the rest is transmitted by the distance ring $6c$ to the last ball race $3d$ on the shaft 1, such ball race in its turn by means of the ball race $5d$ transmitting the rest of the thrust to the ball race $4d$ abutting against the flange $33a$ in the sleeve 33. The pressures from the ball sets on the ball races $4a$—$4c$ mounted in said sleeve are added by means of the intermediate distance rings $7a$ and $7b$, and by means of the distance ring $7c$ they are also transmitted to the last ball race $4d$ abutting against the flange $33a$.

In the bearing means described above, the thrust, or load, will consequently be distributed on a plurality of ball sets, and thereby the bearing will withstand a considerably higher amount of load. The small radial extension, or dimension, of the bearing described is advantageous in two respects, in that the space required for the bearing will be reduced, and the amount of the centrifugal force will be kept low, so that an unnecessary strain on the balls is avoided.

Naturally the thrust is to be distributed on the ball sets in correspondence to the endurance of the same, or in other words in such a manner that the specific ball pressure will be the same in all of the ball sets. If assuming that all of the ball sets consist of balls of the same size and number and adapted to withstand the same pressure, and assuming that the total amount of thrust to be taken up amounts to the value P, each of the ball sets shall be subjected to a load of $P/4$, in case the ball sets are four in number, as indicated in the drawings. This result will be obtained by dimensioning the pressure or distance rings $6a$—$6c$ and $7a$—$7c$ in such a manner that the compression will be equal for all of the same.

Hence, if assuming that the total amount of thrust is P, the first set of balls $5a$ shall get an amount of load of $P/4$, and the rest of the load $=3P/4$ shall be transmitted to the ball race $3b$ by means of the distance ring $6a$. From the last mentioned ball race a load amounting to $P/4$ shall be transmitted to the second ball set $5b$, and the rest amounting to $2P/4$ shall be transmitted to the ball race $3c$ by the distance ring $6b$. A load amounting to $P/4$ shall again be transmitted from the ball race $3c$ to the third ball set $5c$, and the rest $=P/4$ shall be transmitted to the fourth ball race $3d$ by means of the distance ring $6c$, the said rest being transmitted from the last mentioned ball race to the fourth ball set $5d$ and to the ball race $4d$ resting against the flange $33a$ in the sleeve 33.

In order that the compression at all of the distance rings 6a—6c and 7a—7c shall be equally great, so that each of the ball sets will be subjected to the same amount of load of exactly P/4, the size of the annular pressure surfaces of the said rings shall be in a relation to each other similar to the relation of the pressures adapted to be transmitted by each ring, under the condition that all of the rings are of the same axial width and of uniform thickness. In correspondence herewith, and considering the distance rings mounted on the shaft 1, the ring 6a shall have the greatest annular surface, the ring 6b shall have a somewhat smaller annular surface, and the annular surface of the ring 6c shall be the smallest one. On the other hand, if considering the distance rings mounted in the sleeve 33, the ring 7a shall have the smallest annular surface, the ring 7b shall have a somewhat greater annular surface, and the annular surface of the ring 7c shall be the greatest one.

It will be understood from the foregoing, that the essential feature in respect of the distance or pressure rings is the compressibility, which ought to be of such a nature, that none of the ball sets is subjected to a higher pressure than intended, and the circumstances determining for the compressibility may be varied at will by variation of the axial width, the thickness and the nature of the material from which the rings are produced. The compressibility of the rings may also be varied for instance by providing the same with perforations or the like.

Naturally the distance and pressure members mounted between the ball races must not by necessity be given the shape of rings, as described above, as even other shapes thereof may be used. It is also evident that the diameter of the balls must not by necessity be the same in all of the sets thereof, and other antifriction members then balls, such as conical rollers etc., may also be employed, in case the grooves in the ball races are shaped in a corresponding manner.

When the driving shaft 1 (Fig. 1) is set into rotation so as also to rotate the pressure disc 6, the gear disc 8 will be pressed against the rollers 20, and the contact pressure will automatically adapt itself according to the load on the driven shaft 2. In case it is assumed that the pressure disc 6 is rotated in the direction of the arrow x in Fig. 4, the balls 11 located in the recesses 7, 10 will take part in the movement, and according to the amount of load at hand on the driven shaft they will more or less roll upwardly on the inclined surface 17 on the counter disc 9, so that the distance between the discs is increased and the gear disc is pressed against the rollers 20, the contact pressure between these members corresponding to the moment of torsion to be transmitted.

In case the pressure disc 6 is rotated in opposite direction, the balls are caused to roll up on the inclined surface 18 (Fig. 4) in an exactly analogous manner and with the same result. Hence, by these means, a completely automatic control of the pressure between the gear disc and the rollers is obtained in conformity with the amount of load at hand, so that an unnecessary strain on the movable parts is avoided.

According to Fig. 1, the change speed gear is assumed to be of such a kind that the sun wheel 23 connected with the rollers 20 will be driven at exactly the same speed as the opposite sun wheel 24 of the differential gear affixed to the driving shaft 1, when the rollers 20 are in the position in relation to the gear disc 8 shown in the drawings. The result hereof will be that no rotation is transmitted to the driven shaft 2. The starting of the lastmentioned shaft 2 is performed by displacement of the rollers 20 on their shafts 19, either outwardly or inwardly. Thereby the speed of the sun wheel 23 will be greater or smaller than that of the sun wheel 24, and consequently the planet wheel support and the shaft 2 connected therewith will be driven at a variable speed in one direction or the other.

The rollers 20 may be constructed in the same manner as described in the United States patent application Ser. No. 560,181, filed August 29, 1931, and according to which they are composed of three rings mounted in each other and tiltably connected according to the principles of a universal joint, so that the outer ring coacting with the gear disc is permitted within certain limits to adjust itself into an inclined position in relation to its shaft. In practice it has been found, however, that an arrangement of this kind may be dispensed with without inconveniences, and therefore each of the rollers shown in Fig. 1 in the drawings is carried out in one piece.

According to the invention, the displacement of the rollers 20, inwardly or outwardly in relation to the gear disc 8, is adapted to be performed by hydraulic means.—As shown in Fig. 2, the casing 5 is provided with two cylinders 34, 34 positioned oppositely substantially at a common axis, a pair of pistons 35, 35 being reciprocably mounted within said cylinders and provided with suitable packing means 36, 36. The two pistons 35, 35 are connected with each other by means of a link 37 which is connected with another link 38, and the latter is connected with the two-armed lever 38a rotatably mounted on the shaft 1. At its ends the said lever 38a is connected with links 39, 39 extending towards opposite sides thereof. Each of the links 39 is connected with a pair of rings 40, 40 positioned at opposite sides of each of the rollers 20, such rings 40 running on ball sets 40a so as not to take part in the rotation of the corresponding roller 20. At the tilting of the lever 38a, the rollers 20 will naturally be displaced an equal distance inwardly or outwardly on the gear disc 8. Due to the fact that the force needed for such displacement is applied to the rollers at their one side only and at the circumference of the same, the rollers will be inclined a little in relation to their shaft, and thereby the rollers will run inwardly or outwardly along a helical path of contact with the gear disc 8 at the rotation of the latter, and without damaging the working faces of the deformation gear.

The displacement of the pistons 35 is performed by means of a pressure fluid, for instance oil, and the admission of this fluid to the cylinders is controlled by means of a cock 41, or equivalent valve member, mounted in the casing 5, such cock being controlled by means of a lever 42. The cock housing is provided with an inlet channel 43 for the pressure fluid, such channel communicating with two other channels 44 and 45 leading to the interior of the cock housing and serving for the admission of the pressure fluid to one or the other of the cylinders. In the position of the cock plug shown in the drawings, the upper channel 44, by means of the channel 46 in said plug, stands in connection with a channel 47 leading to the upper cylinder. Hence, the pressure fluid will be admitted to said upper cylinder and serves to press down the piston therein, while simultaneously the pressure fluid within the lower cylinder will be discharged to the gear casing by means of the channel 48, the port 49 in the cock plug, and the bore 50 through the wall of said casing. When turning the cock plug a suitable angle, the pressure fluid entering by the inlet 43 will pass through the lower channel 45, the port 51 in the cock plug, and the channel 48 to the lower cylinder, so that the piston therein is displaced upwardly, while simultaneously the pressure fluid within the upper cylinder is discharged through the channel 47, the port 52 in the cock plug, and the bore 53 in the wall of the gear casing to the interior of said casing.

Hence, it will be understood that a tilting movement of the lever 38a may be performed by manipulation of the cock plug, so that the rollers 20 are displaced outwardly or inwardly in relation to the gear disc 8, the speed of the driven shaft 2 being varied accordingly. In an intermediate position of the cock plug, both the inlet and outlet for the pressure fluid are closed, and thereby the pistons 35 are locked so that the rollers 20 are maintained in the positions taken.

The pressure fluid needed for the control device may be delivered for instance by a separate pump adapted in a suitable manner to be driven by a rotating part of construction of the gear. It is more advantageous, however, to provide a pumping means in the gear disc 8, as will be described in the following:—For this purpose the gear disc is provided with a suitable number of channels 54 adapted to connect the space between the discs 6 and 9 with an annular groove or channel 55 at the inner face of the gear casing 5, such channel being confined by the circumference of the gear disc and a couple of circumferential ridges 56, 57, positioned interiorly within said casing. The gear casing is intended to be substantially half filled with oil, and at the rotation of the gear disc a portion of this oil will be forced outwardly through the channels 54 due to the centrifugal action, such oil approaching the circumference of the gear disc and entering into the annular channel 55 which is coupled to the inlet 43 of the cock housing by a suitable channel means not shown in the drawings. The amount of play between the circumference of the gear disc and the inner faces of the ridges 56, 57 is kept as small as possible, so that no appreciable leakage can occur transversally therethrough, and the desired oil pressure is maintained thereby.

Fig. 3 shows a change speed gear of the same type as shown in Fig. 1 but modified in so far that no toothed gears are at hand therein, in that both the sun wheels and planet wheels of the differential gear, and also the driving connection means between the rollers 20 and one of the sun wheels of the differential gear are adapted to function according to the deformation principles in the same manner as the coacting rollers and gear disc referred to in the foregoing.

In the embodiment according to Fig. 3, the automatic pressure control device, the gear disc and the rollers coacting with the latter are mounted substantially as described with reference to Fig. 1, and a further description hereof seems superfluous.

Instead of toothed gears, the inner end of each of the shafts 19 is provided with a roller 22a having a conical or convex working face at the circumference, such roller coacting with a correspondingly shaped working face on a runner disc 23a. The said runner disc may be mounted directly on the shaft 1, but preferably it is mounted by the intermediary of a spherical ball bearing 58, as shown in the drawings, so as to make it possible to the disc to adjust itself or said shaft. A little further to the right, the driving shaft 1 is provided with another runner disc 24a mounted axially displaceably on but non-rotatably in relation to said shaft, and the two runner discs 23a and 24a are adapted to coact by means of a suitable number of intermediate rollers 25a mounted by means of needle bearings on radial pins 26a affixed to a cup-shaped member 27a connected with the driven shaft 2. Hence, it will be understood that the runner discs 23a, 24a will correspond to the sun wheels in a differential gear, while the rollers 25a and the cup-shaped member 27a will correspond to the planet wheels and the planet wheel support therein, respectively. By means of the needle bearing 4a the driven shaft 2 is mounted in the gear casing 5, and besides it is mounted on the driving shaft 1 by means of the spherical ball bearing 28a, the driving shaft 1 being remounted in the planet wheel support 27a by means of the ball bearing 29a. The planet wheels and sun wheels 25a, 23a, 24a may be provided with conical, spherical or otherwise suitably shaped working faces.

In the embodiment of the gear shown in Fig. 3, the displacement of the rollers 20 inwardly or outwardly in relation to the gear disc 8 is intended to be performed by means of an arrangement of the same kind as described above with reference to Figs. 1 and 2.

In order to make it possible to transmit the desired working effect from the driving shaft 1 to the driven shaft 2, it is essential that the runner discs and the rollers 22a, 23a, 24a, and 25a are produced from the same hard and elastically deformable material as the rollers 20 and the gear disc 8, and that the former are pressed against each other with an amount of contact pressure of the same order as the contact pressure between the latter, so that the working faces of the runner discs and their coacting rollers will be temporarily deformed and engaging in a similar manner as toothed gear members.

Therefore it is preferable to permit the reaction pressure from the pressure control means 6–11 described above to perform the contact pressure between the members 22a, 23a, 24a, and 25a. For this purpose the right hand end of the driving shaft 1 is provided with a nut 59 abutting against the inner ball race of the ball bearing 29a, the sun wheel member 24a abutting against the opposite end of said ball race.

In case the pressure between the gear disc 8 and the rollers 20 is increased, it is evident without further explanation that the pressure between the members 24a, 25a, 23a and 22a will be increased in a corresponding degree, i. e. the contact pressure between all of the coacting parts of construction of the change speed gear will be automatically adjusted according to the load on the driven shaft 2. Due to the utilization of the reaction pressure as described above, a thrust bearing corresponding to the bearing 31 in Fig. 1 will be superfluous in this construction. The nut 59 serves also the purpose of establishing the required initial pressure between the coacting rotational parts of construction.

The bearing pins 26a of the planet wheel support member 27a are preferably arranged in such a manner that they take an inclined position radially to the driving shaft 1, and the sun wheel members 23a and 24a are provided with tapering working faces in correspondence herewith. By this arrangement the advantage is gained that the outwardly displacing effect caused by the centrifugal force and acting upon the planet wheel members 25a is counteracted. Finally, the sun wheel members may also be provided with somewhat concave working faces, as shown in the drawings, and the centres of the radii to such working faces ought to be positioned on the line a—a perpendicular to the axis of the rotation of the planet wheel members. By a construction of this kind, the differential gear will be able to withstand a greater amount of load.

In the gear means shown and described in the United States patent application Ser. No. 560,181, filed August 29, 1931, the rollers coacting with the gear disc are mounted on their shafts by the intermediary of balls adapted to roll in longitudinal grooves in said shafts. A bearing means of this kind involves certain disadvantages, however.—Firstly, the roller hub, while sliding up and down on the shaft, is always to be supported by the same number of balls, and therefore the axial length of the ball series in each groove must be greater than the corresponding dimension of the roller hub. Herefrom it follows that some of the balls must always be positioned outside or beyond the ends of said roller hub, and then they will get a tendency to be thrown out from their correct positions due to the centrifugal action, in case they are not prevented therefrom by some suitable means. According to the said patent, the balls are kept in position by means of a cylindrical ball cage, in which the apertures for the balls must be subjected to a finishing treatment by means of a conical or spherical cutter, this treatment being performed from the inner side of the ball cage. Naturally this circumstance will involve rather great difficulties in the manufacture of said cages.—Further the possibility is at hand that the balls, at the displacement of the roller in relation to its shaft, will not be displaced exactly one half of the amount of the first named displacement, and hereby a sliding of the balls in their end positions will sometimes be required.

These disadvantages are eliminated by the bearing means proposed according to the present invention. The main characteristic of the new bearing means is that the balls are no longer positioned in a straight row in the groove in the shaft, but each set thereof is positioned in an endless channel 64 having a circular shape in cross section. This channel 64 is partially positioned in the hub portion of the roller, and partially in a corresponding longitudinal groove in the shaft, and in grooves in the annular members 63 and 64 connected with the hub portion of the roller in a suitable manner, as nearer to be understood from the Figs. 1, 3 and 6, the last mentioned figure showing two different sections of the bearing means, one at the line A—A and the other at the line B—B in Fig. 1. As will be seen from Fig. 1, the channel 64 consists of two straight sections positioned within the hub portion of the roller, and two semi-circular end sections connecting the former and positioned in the annular members 63 and 64, respectively. It is evident, however, that other shapes of the endless channel might also be used to the same result in practice.

The balls are of a number so as completely to fill up the corresponding guide channel, and at the displacement of the roller they will successively be fed into the pressure zone of the channel, either in one direction or the other. It will be evident without further explanation that, in comparison with the known bearing means, a bearing of this kind will involve the advantage that the number of the balls employed in each series thereof is independent of the length of travel of the hub portion of the roller when displacing the same on its shaft. In the bearing means just described, the balls may naturally be substituted by suitably shaped rollers or similar antifriction members, in case the cross section of the guide channel is shaped accordingly.

Although the constructional members described above are to be considered to form suitable embodiments of the invention, the latter is not limited thereto, otherwise than defined by the following claims, and the different parts of construction may be varied in many ways without departing from the principles of invention.

What I claim and desire to secure by Letters Patent is:—

1. In a continually variable change speed gear, a driving shaft and a driven one, a differential gear the planet wheel support of which is connected with the driven shaft, a sun wheel belonging to said differential gear and connected with the driving shaft, a second sun wheel belonging to the same differential gear and connected with said shaft by the intermediary of a gear means consisting of a gear disc adapted to be set into rotation from the driving shaft, and a number of rollers or the like mounted axially displaceable on but non-rotatable in relation to shafts positioned radially to the axis of the gear disc, the gear disc and the rollers being produced from a very hard but somewhat elastic material so that said gear members when hardly pressed against each other will be subjected to a temporary deformation at the points of contact, means for exerting a great contact pressure between the gear disc and the rollers coacting therewith, and means adapted automatically to control said contact pressure according to the load on the driven shaft.

2. In a continually variable change speed gear, a driving shaft and a driven one, a pressure disc fixedly mounted on the driving shaft, a counter disc loosely mounted on said shaft, a gear disc connected with said counter disc, the pressure disc and the counter disc at their adjacent surfaces being provided with registering recesses having surfaces inclining to the plane of rotation of the discs, balls positioned in said recesses and adapted to run up on said inclining surfaces in a degree depending on the driving torque and the oppositely directed reaction torque, so as thereby to increase the axial distance between the discs accordingly, a differential gear the planet wheel support of which is connected with the driven shaft, a sun wheel belonging to said differential gear and adapted to be rotated by the driving shaft, a second sun wheel belonging to the same differential gear and connected with said shaft by the intermediary of a gear means consisting of the aforesaid gear disc and a number of rollers or the like mounted axially displaceably on but non-rotatably in relation to shafts positioned radially to the axis of the gear disc, the gear disc and the coacting rollers being produced from a very hard and somewhat elastic material so that said gear members when hardly pressed against each other will be subjected to a temporary deformation at the points of contact, and means for exerting a great contact pressure between the gear disc and the rollers coacting therewith.

3. In a continually variable change speed gear according to claim 2, the additional feature of a laminated friction clutch means interposed between the counter disc and the gear disc, and adapted to limit the maximal amount of torque transmitted therebetween.

4. In a continually variable change speed gear, a driving shaft and a driven one, a differential gear the planet wheel support of which is connected with the driven shaft, a sun wheel belonging to said differential gear and connected with the driving shaft, a second sun wheel belonging to the same differential gear and connected with said shaft by the intermediary of a deformation gear means consisting of hard but somewhat elastic gear members having smooth surfaces in contact with each other, pressure fluid actuated means adapted for displacement of said gear members in relation to each other in order thereby to vary the gear ratio, means for exerting a great contact pressure between the deformation gear members, and means adapted automatically to control said contact pressure according to the load on the driven shaft.

5. In a continually variable change speed gear according to claim 4, the additional features that the deformation gear means consist of a gear disc connected with the driving shaft and a number of rollers coacting with said disc and radially displaceable in relation thereto, and that the pressure fluid actuated means is adapted for displacement of said rollers and consists of piston means connected with the rollers by the intermediary of a link and lever mechanism, a valve means being provided for the control of the admission of the pressure fluid to said piston means.

6. In a continually variable change speed gear, a driving shaft and a driven one, a differential gear the planet wheel support of which is connected with the driven shaft, a sun wheel belonging to said differential gear and connected with the driving shaft, a second sun wheel belonging to the same differential gear and connected with said shaft by the intermediary of a deformation gear means consisting of hard but somewhat elastic gear members having smooth surfaces in contact with each other, means for exerting a great contact pressure between the deformation gear members so as temporarily to cause a deformation of the same at the points of contact, a fluid tight casing surrounding the movable parts of construction of the change speed gear, fluid pressure actuated means adapted for displacement of said gear members in relation to each other in order thereby to vary the gear ratio, means combined with one of the rotatable parts of construction of the change speed gear and adapted to establish the required fluid pressure, means for exerting a great contact pressure between the deformation gear members, and means adapted automatically to control said contact pressure according to the load on the driven shaft.

7. In a continually variable change speed gear, a driving shaft and a driven one, a pressure disc fixedly mounted on the driving shaft, a counter disc loosely mounted on said shaft, a deformation gear disc connected with said counter disc by the intermediary of transmission means adapted to limit the amount of torque transmitted between the former and the latter, recesses in the opposing faces of the pressure disc and the counter disc such recesses being provided with working faces inclined to the axis of rotation, rotational antifriction means positioned in said recesses and adapted to run up on said inclining surfaces in a degree depending on the driving torque and the oppositely directed torque of reaction so as thereby to control the amount of torque transmitted between the counter disc and the deformation gear disc, a differential gear the planet wheel support of which is connected with the driven shaft, a sun wheel belonging to said differential gear and connected with the driving shaft, a second sun wheel belonging to said differential gear and connected with said shaft by the intermediary of a deformation gear means consisting of the aforesaid gear disc and a number of rollers or the like mounted axially displaceable on but non-rotatably in relation to shafts positioned radially to the gear disc, means for exerting a great contact pressure between the gear disc and the rollers coacting therewith, and means adapted automatically to control said contact pressure according to the load on the driven shaft and the torque of reaction created by such load.

8. In a continually variable change speed gear according to claim 7, the additional feature that pressure fluid actuated means are provided for the axial displacement of the deformation gear rollers, such means acting upon the said rollers by means of an intermediary link and lever mechanism.

9. In a continually variable change speed gear, a driving shaft and a driven one, a differential gear the planet wheel support of which is connected with the driven shaft, a sun wheel belonging to said differential gear and connected with the driving shaft by the intermediary of a deformation gear means consisting of hard but somewhat elastic gear members having smooth surfaces in contact with each other, such gear members being adapted to be temporarily deformed at the points of contact, means for exerting a great contact pressure between the deformation gear members, means adapted to control this contact pressure according to the torque transmitted by the driving shaft, a fluid tight casing surrounding the movable parts of construction of the change speed gear, such casing being adapted in part to be filled with a fluid lubricant, means combined with the deformation gear disc and coacting with the surrounding casing, such means being adapted by means of the centrifugal force to create a pressure on a portion of said lubricant, and means actuated by said lubricant pressure and adapted to control the gear ratio of the deformation gear.

10. In a continually variable change speed gear, a driving shaft and a driven one, a deformation gear disc adapted to be driven by the driving shaft and to coact with a number of rollers contacting with said disc and mounted axially slidable on but non-rotatably in relation to separate shafts positioned radially in relation to the axis of rotation of the disc, a differential gear one sun wheel member of which is disc-shaped and loosely mounted on the driving shaft, preferably by means of a spherical antifriction bearing, said sun wheel member, or disc, at one side being adapted to coact with rollers mounted on the shafts of the deformation gear rollers, and at the opposite side with planet rollers mounted in the planet wheel support of the differential gear, said planet rollers also coacting with a second disc-shaped sun wheel member belonging to the differential gear and mounted on the driving shaft, means for creating a great contact pressure between the disc shaped gear members and the rollers coacting therewith by utilization of the torque of reaction opposing the driving power applied to the driving shaft.

11. In a continually variable change speed gear according to claim 10, the additional feature that the shafts of the planet gear rollers are positioned in an inclination to the driving shaft in order to counteract the outwardly displacing effect caused by the centrifugal force.

12. In a continually variable change speed gear according to claim 10, the additional feature that the deformation gear rollers are mounted on their shafts by the intermediary of ball bearings each comprising of a plurality of ball series confined in endless channels formed in the roller hubs and consisting in part of longitudinal channels formed in the roller shafts.

13. In a continually variable change speed gear, a driving shaft and a driven one, a pressure disc fixedly mounted on the driving shaft, a counter disc loosely mounted on the said shaft and connected with a gear disc by the intermediary of means adapted for limitation of the torque transmitted therebetween, means interposed between the pressure disc and the counter disc and adapted to wedge them apart in a degree corresponding to the amount of torque applied to the driving shaft, a thrust bearing means mounted on the driving shaft and adapted to take up the reaction thrust acting on the pressure disc, such bearing means consisting of a plurality of ball sets and corresponding ball races acting in series, distance members positioned between the ball races and adapted to distribute the thrust in an equal manner to all of the ball sets, a differential gear the planet wheel support of which is connected with the driven shaft, a sun wheel belonging to said differential gear and adapted to be rotated by the driving shaft, a second sun wheel belonging to the same differential gear and connected with said shaft by the intermediary of gear means consisting of the aforesaid gear disc and a number of rollers or the like mounted axially displaceably on but non-rotatably in relation to shafts positioned radially to the axis of the gear disc, the gear disc and the coacting rollers being produced from a very hard but somewhat elastic material so that the gear members when hardly pressed against each other will be subjected to a temporary deformation at the points of contact, and means for exerting a great contact pressure between the gear disc and the rollers coacting therewith.

14. In a continually variable change speed gear according to claim 13, the additional feature that the differential gear is constructed according to the principles of a deformation gear and consists of gear members having smooth surfaces in contact with each other, such gear members being produced from a hard but somewhat elastic material adapted to be temporarily deformed at the points of contact.

15. In a continually variable change speed gear according to claim 13, the additional feature that the thrust bearing member is provided with coacting pairs of ball races, one ball race in each pair being mounted on the driving shaft, the other being mounted in a sleeve surrounding the shaft.

16. In a continually variable change speed gear according to claim 13, the additional features that the thrust bearing member is provided with coacting pairs of ball races, one ball race in each pair being mounted on the driving shaft, the other being mounted in a sleeve surrounding said shaft, and that the distance members between the ball races consist of rings mounted on the shaft and in the sleeve, respectively.

17. In a continually variable change speed gear according to claim 13, the additional feature that the distance members positioned between the ball races are constructed in a manner so that the specific load on the balls will be substantially the same in all of the ball sets.

18. In a continually variable change speed gear, a driving shaft and a driven one, a differential gear means the planet wheel support of which is connected with the driven shaft, a sun wheel member produced from a hard but somewhat elastic material and having a smooth working face, such sun wheel member being connected with the driving shaft, a second sun wheel member constructed from a similar material and in the same manner as the former, such second mentioned sun wheel member belonging to the same differential gear means and connected with said shaft by the intermediary of a deformation gear means having a variable gear ratio, means for exerting a great contact pressure between the members of the differential gear means and the deformation gear means, and means adapted automatically to control said pressure according to the load on the driven shaft.

19. In a continually variable change speed gear according to claim 18, the additional feature of pressure fluid actuated means adapted for varying the gear ratio of the deformation gear by displacement of its members in relation to each other.

In testimony whereof I have signed my name to this specification.

OTTO GOTTFRIED WELLTON.